United States Patent
Logan

(10) Patent No.: US 11,425,893 B2
(45) Date of Patent: Aug. 30, 2022

(54) BEEHIVE SYSTEM, KIT AND METHOD

(71) Applicant: Benjamin J. Logan, Lapeer, MI (US)

(72) Inventor: Benjamin J. Logan, Lapeer, MI (US)

(*) Notice: Subject to any disclaimer, the term of this patent is extended or adjusted under 35 U.S.C. 154(b) by 36 days.

(21) Appl. No.: 17/002,046

(22) Filed: Aug. 25, 2020

(65) Prior Publication Data
US 2021/0059224 A1 Mar. 4, 2021

Related U.S. Application Data

(60) Provisional application No. 62/891,506, filed on Aug. 26, 2019.

(51) Int. Cl.
*A01K 47/00* (2006.01)
*A01K 47/06* (2006.01)
*A01K 53/00* (2006.01)

(52) U.S. Cl.
CPC .............. *A01K 47/06* (2013.01); *A01K 53/00* (2013.01)

(58) Field of Classification Search
CPC ...... A01K 47/00; A01K 53/00; A01K 1/0047; A01K 1/0052; A01K 1/0058; A01K 1/0064; F16K 31/002; F24F 7/00
See application file for complete search history.

(56) References Cited

U.S. PATENT DOCUMENTS

| | | |
|---|---|---|
| 395,382 A | 1/1889 | Crowell |
| 2,574,768 A | 11/1951 | Taylor |
| 4,406,861 A * | 9/1983 | Beauvais ............... A61L 2/06 422/113 |
| 4,443,904 A | 4/1984 | van Muyden |
| 5,211,597 A * | 5/1993 | Scott .................. A01K 47/00 449/27 |
| 5,741,170 A * | 4/1998 | Orletsky .............. A01K 47/00 449/7 |
| 2004/0003724 A1* | 1/2004 | Ellis ................... B01D 53/02 96/115 |
| 2012/0256417 A1* | 10/2012 | Smirnov .............. F16L 23/00 |

* cited by examiner

*Primary Examiner* — Joshua E Rodden
*Assistant Examiner* — Henry Hooper Mudd
(74) *Attorney, Agent, or Firm* — Carrier Blackman & Associates, P.C.; William D. Blackman; Joseph P. Carrier

(57) ABSTRACT

A beehive system includes a main hive body with opposed, insulated side walls having access ports formed respectively therein. A vent assembly fits into an access port, and includes a valve case with an outer housing, a coaxial core portion, and plural opposed panels between the outer housing and the core portion, with openings formed between the panels. A pivotally movable valve member includes a core portion and two or more blades attached to and extending outwardly from the core portion. The valve member cooperates with the valve case to regulate air flow through the vent assembly. A bimetallic coil interconnects the valve case and the valve member, and a perforated screen cover is attached to the valve case to allow air flow therethrough. A kit of components usable to retrofit an existing hive, and a method of retrofitting an existing beehive to add a vent thereto, are also disclosed.

16 Claims, 12 Drawing Sheets

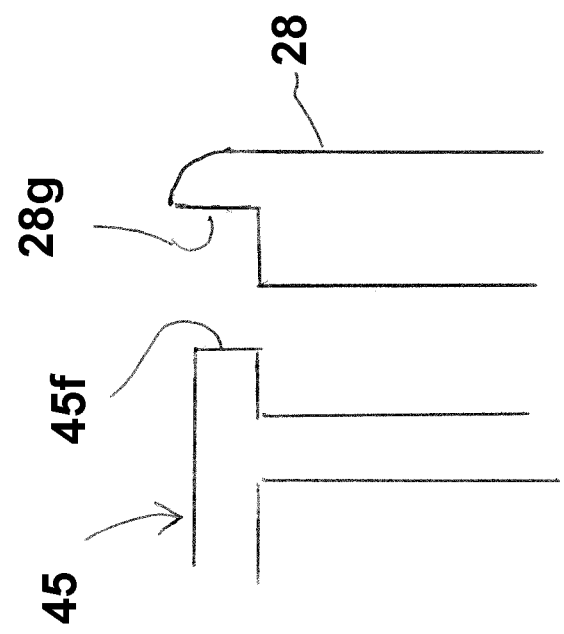

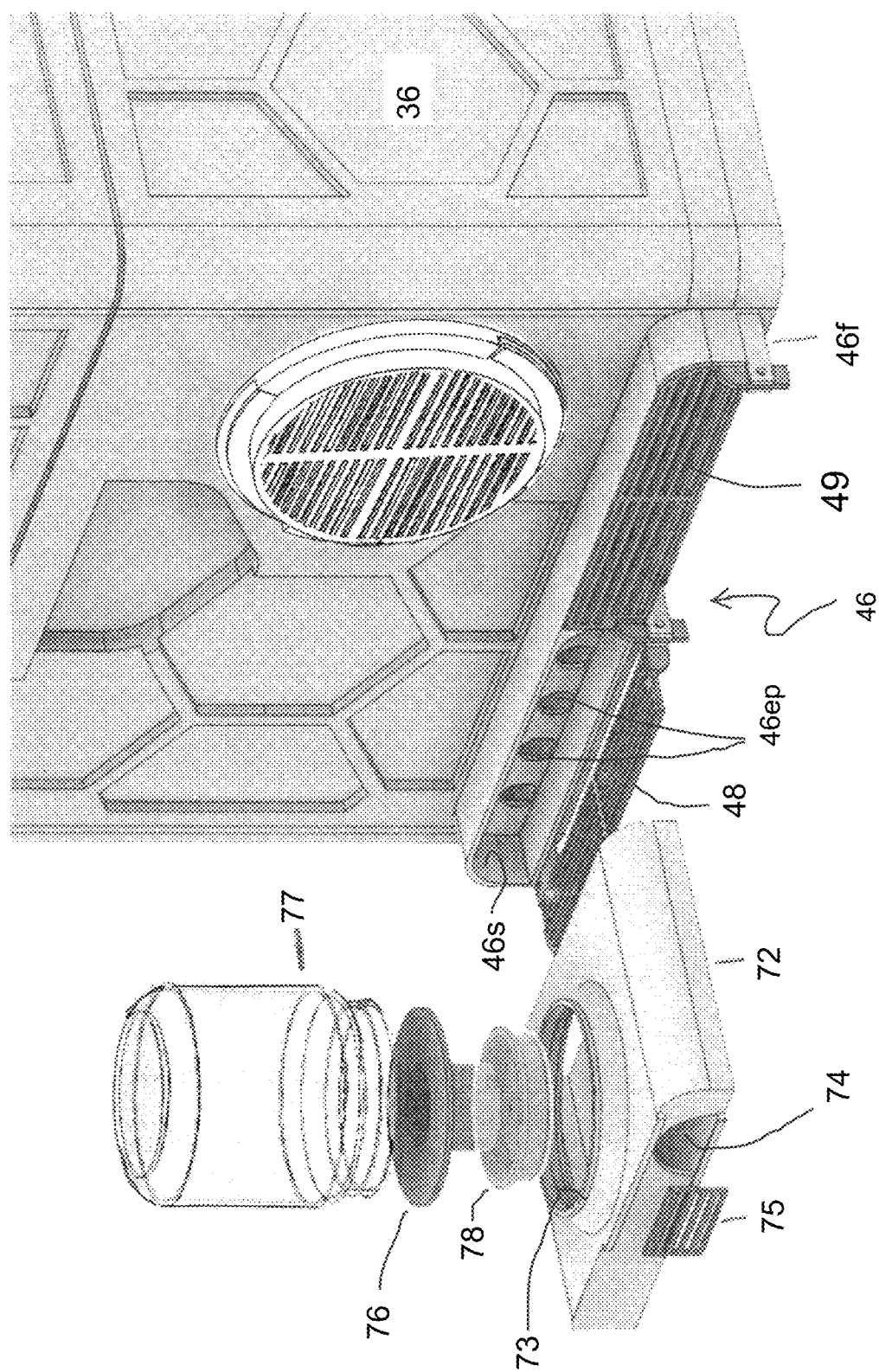

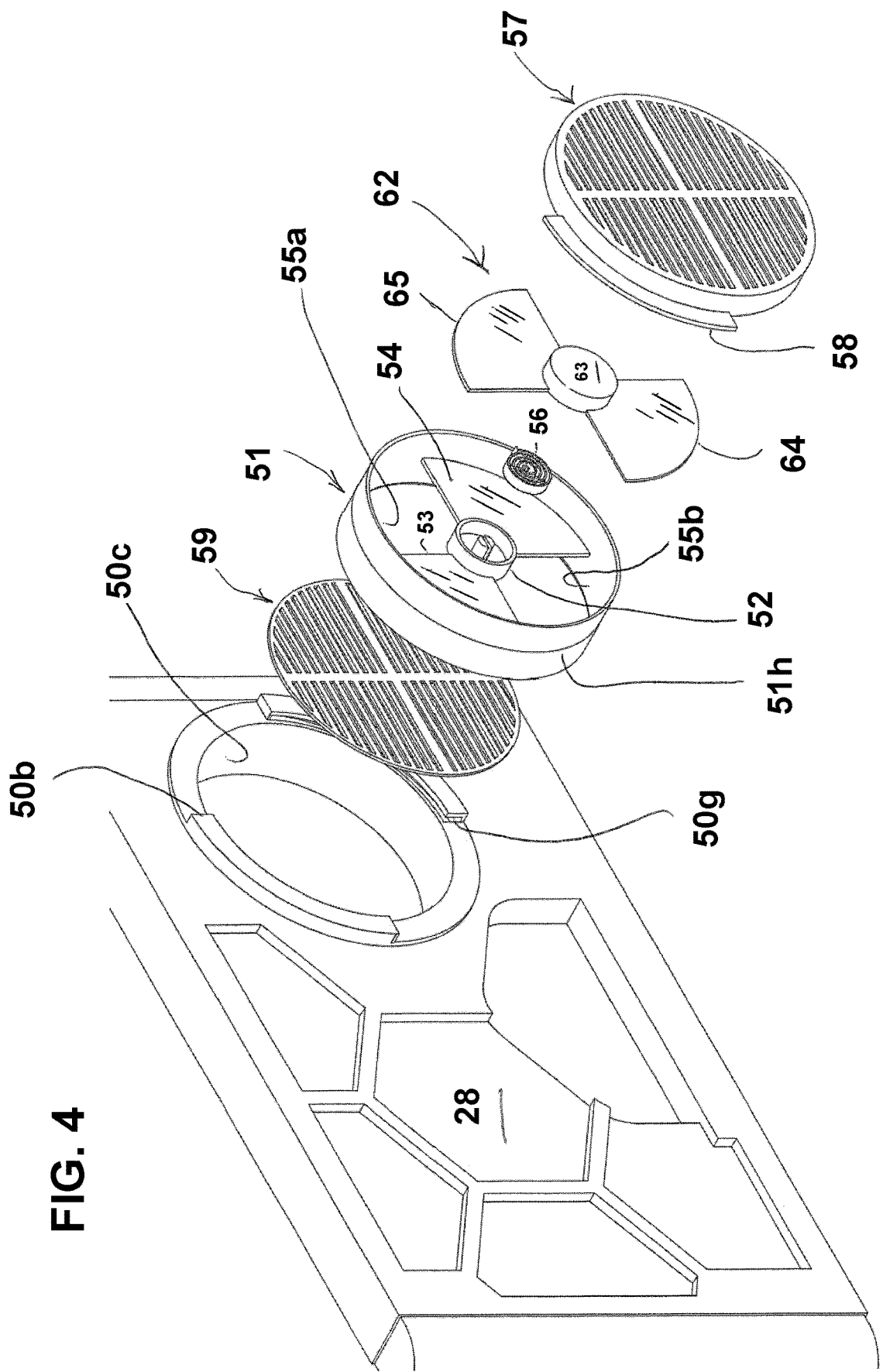

BEEHIVE SYSTEM, KIT AND METHOD

CROSS-REFERENCE TO RELATED APPLICATIONS

The present application claims priority under 35 U.S.C. 119(e), based on U.S. provisional patent application 62/891,506, filed Aug. 26, 2019. The entire disclosure of the referenced provisional priority document, including specification, claims, and drawings, is incorporated by reference herein.

BACKGROUND OF THE INVENTION

Field of the Invention

The present invention relates to improvements in bee hives and beekeeping. More particularly, the present invention relates to a beehive which combines insulated walls and a ventilation assembly which automatically provides ventilation to the hive when needed. The present invention also relates to a kit of components and a method of modifying an existing hive.

Description of the Background Art

The world of bee keeping has not changed greatly in the last 150 or more years. The most popular hive, the Langstroth, was patented in October of 1852. Other styles such as the Topbar and Warre hives are used, but not to the same extent as the Langstroth.

However, our way of agriculture has changed greatly over the same time period, and these changes have caused challenges for the bees and for beekeepers. The present invention addresses some of these issues.

Some farmers in the US use bees for pollination of selected crops, where the bees are temporarily provided, as needed, by traveling bee service companies, and such bee service companies transport hives inside, or on the back of trucks. Many of these traveling commercial hives are not ventilated, and if the trucks are traveling in warm environments, this may be fatal to a high number of bees, such as 50 percent or more.

In addition, if these hives are not closed off during transport to prevent bees from leaving the hive, such bees may be unable to find their way back to the hive entrance while the hive is in motion, and these straggler bees may be lost or killed.

U.S. Pat. No. 395,382 to Crowell (1889) discloses a generic damper which is operated by a bimetallic strip.

U.S. Pat. No. 2,574,768 to Taylor (1951) discloses a temperature-responsive ventilator for beehives, using a bimetallic element to actuate a ventilator slide, housed in a frame that rests on the top edges of the walls of a standard rectangular beehive.

Some insulated beehives are known and commercially available, such as, for example, those sold at the website apimaye-usa.com.

In addition, U.S. Pat. No. 4,443,904 to van Muyden discloses a beehive having insulating features.

Although the known beehives are useful for their intended purposes, a need still exists in the art for improved beehive designs. In particular, there is a need for an improved hive design which will overcome the difficulties encountered with the known art.

SUMMARY OF THE INVENTION

The present invention an improved beehive system, kit and method. In particular, it is believed that the combination of insulating walls of the hive, selectively providing ventilation as needed, and optionally, controlling egress of bees from hives during transport will help to increase viability of bees and prolong the life of a hive.

A beehive system according to one aspect of the invention includes an insulated main hive body having a base, side walls and a roof, along with a closeable entrance structure, and a ventilation assembly. Optionally, a removable bee feeder, which fits into the entrance structure, may also be provided.

Each component of the present system provides an improvement to existing beekeeping technologies, yet still is compatible with existing equipment.

The beehive system according to the invention is designed to reduce or eliminate the problem of thermal stress for honey bee colonies used by migratory bee keepers, and to help promote viability of colonies used by bee keepers in cold and hot climates.

In combination with the insulated panel design, and a unique automatic venting system, that may be used to create an even cross flow of air in the hive when needed, the system promotes honey bee health and longevity. The end result is increased bee longevity and a more effective pollinator that is a key element in stabilizing our food supply.

A beehive system according to one illustrative embodiment of the invention includes a main hive body with opposed, insulated side walls, each having an access port formed respectively therein.

A vent assembly fits into one or both of the access ports, and the vent assembly includes a valve case with a cylindrical outer housing, a coaxial core portion, and two or more panels extending between the outer housing and the core portion. The valve case also has openings formed therein between the panels.

The vent assembly also includes a pivotally movable valve member which is operatively attached to the valve case. The valve member cooperates with the valve case to regulate air flow through the vent assembly. The valve member has a core portion and two or more sector-shaped blades attached to, and extending outwardly from the core portion. The number of blades on the valve member corresponds to a number of the openings formed in the valve case, and the blades operate to selectively open or close the openings in the valve case.

A bimetallic coil interconnects the valve case and the valve member to control pivotal movement of the valve member, and a perforated screen cover is attached to the valve case to allow air flow therethrough.

The hive system hereof may, optionally, also include a removable feeder assembly and a closeable gate.

A kit of components usable to retrofit an existing hive, and a method of retrofitting an existing beehive to add a vent thereto, are also contemplated by the present invention.

A beehive system according to a selected illustrative embodiment of the invention includes a main hive body having a floor, four side walls and a removable roof panel, each of the side walls having insulating material therein, wherein two of the side walls disposed opposite one another each have an access port formed respectively therethrough.

The beehive system includes at least one vent assembly configured to fit into one of the access ports, where the vent assembly includes a valve case, and a pivotally movable valve member attached to the valve case by a bimetallic coil disposed therebetween, where the valve member cooperates with the valve case to regulate air flow through the vent assembly.

The valve case has a cylindrical outer housing, a core portion disposed coaxially inside of the housing, and a plurality of sector-shaped panels interconnecting the outer housing and the core portion. A plurality of sector-shaped openings are formed in the valve case between the panels.

The valve member has a central core portion and a plurality of sector-shaped blades attached to and extending radially outwardly from the core portion; where the blades are configured to selectively cover all or part of the openings in the valve case.

The bimetallic coil is interposed between, and interconnects the valve case and the valve member.

The valve assembly also includes a perforated screen cover operatively attached to the valve case, the screen cover configured to allow air flow therethrough.

Each of the side walls of the main hive body may have a laminated insulating structure including a plastic outer wall, a plastic inner wall and an insulating foam board disposed between the inner and outer walls. A roof panel provided at the top of the main hive body may have a similar laminated construction.

The beehive system hereof may additionally include an entrance structure attached to the main hive body, the entrance structure having at least one closeable gate.

Optionally, the beehive system hereof may further include a feeder assembly that nestingly fits into the closeable gate, where the feeder assembly includes a hollow feeder body made in a substantially flattened shape, and configured to firmly fit in the entrance structure with the gate open, the feeder body having a passage formed therethrough to allow bees to pass through the feeder assembly and enter the hive, wherein the feeder body has a closeable outer gate at the entrance to the passage, to allow selective regulation of a flow of bees therethrough;

Where used, the feeder assembly includes a container for holding a liquid bee food, and a dispenser that uses a vacuum that builds up within the container during use, to regulate dispensing of the bee food into a bee feeding tray.

Optionally, the valve assembly is attachable to the main hive body via a bayonet mount, in which a plurality of radially extending flanges are provided on the outer screen cover, the flanges slidably insertable into a plurality of arcuate grooves provided in an outer collar attached to the main hive body.

Another aspect of the present invention provides a kit of components usable to modify a beehive to selectively provide ventilation thereto, the kit including at least one vent assembly configured as described above.

The vent assembly may also include an outer cylindrical collar with bosses having arcuate grooves formed therein. The kit may additionally include a second vent assembly which is substantially identical to the first vent assembly.

The kit according to the invention may further include an entrance structure having at least one closeable gate, where the entrance structure is configured as previously described.

The kit according to the invention may, optionally, also include a feeder assembly that fits nestingly into an opening formed in the entrance structure, where the feeder assembly is configured as previously described.

In another aspect of the present invention, a method of retrofitting an existing bee hive can be used to provide ventilation to the hive.

The retrofitting method hereof includes a first step of forming a cylindrical access hole in a first side wall of the bee hive, and a second step of installing a first vent assembly in the access hole formed in the first side wall, where the vent assembly includes a valve case, and a pivotally movable valve member attached to the valve case by a bimetallic coil disposed therebetween. The valve member cooperates with the valve case to regulate air flow through the vent assembly.

The vent assembly is configured as previously described herein.

The method may further include additional steps of forming a second cylindrical access hole in a second side wall of the bee hive opposite the first side wall, and installing a second vent assembly in the access hole formed in the second side wall, the second vent assembly being substantially identical to the first vent assembly.

Optionally, the method according to the invention may further include a step of attaching an entrance structure having a closeable gate to the first side wall, where the entrance structure is configured as previously described herein.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 2D is a sectional detail plan view showing part of a frame-supporting wall of the hive and also showing part of a frame.

FIG. 3B is an exploded perspective view of the entrance and feeder accessories.

FIG. 4 is an exploded perspective detail view showing a hive front wall and a thermostatically controlled vent assembly, seen from an external vantage point.

DETAILED DESCRIPTION OF ILLUSTRATIVE EMBODIMENTS

Figure 1A:
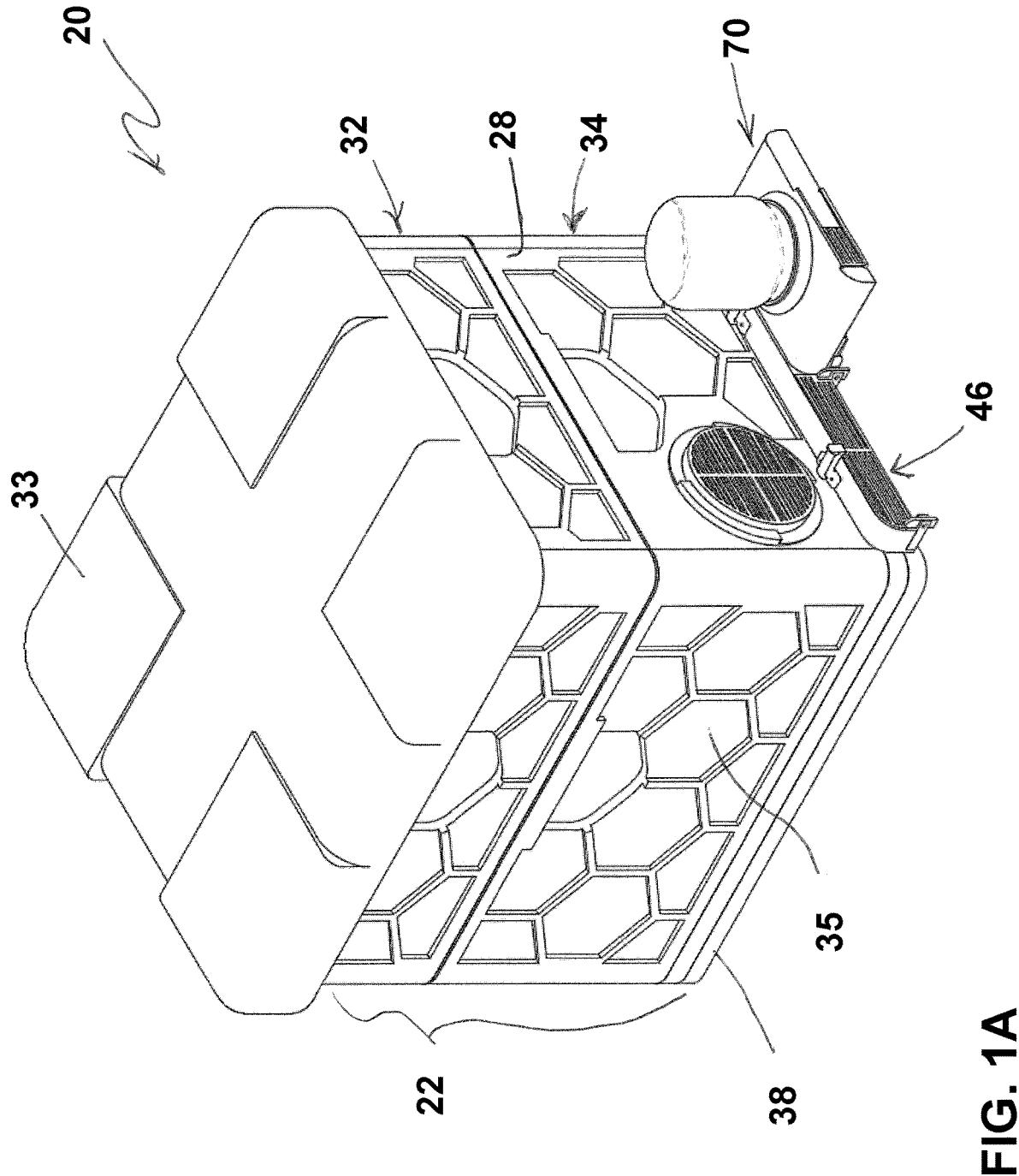
FIG. 1A is a first perspective view of a beehive system according to an illustrative embodiment of the invention, taken from a vantage point above and to the left of a front wall of the hive, and showing the front of the hive including an insulated main hive body, thermostatically controlled vent, bottom board, and roof panel, along with an optional entrance and feeder assembly.
Figure 1B:
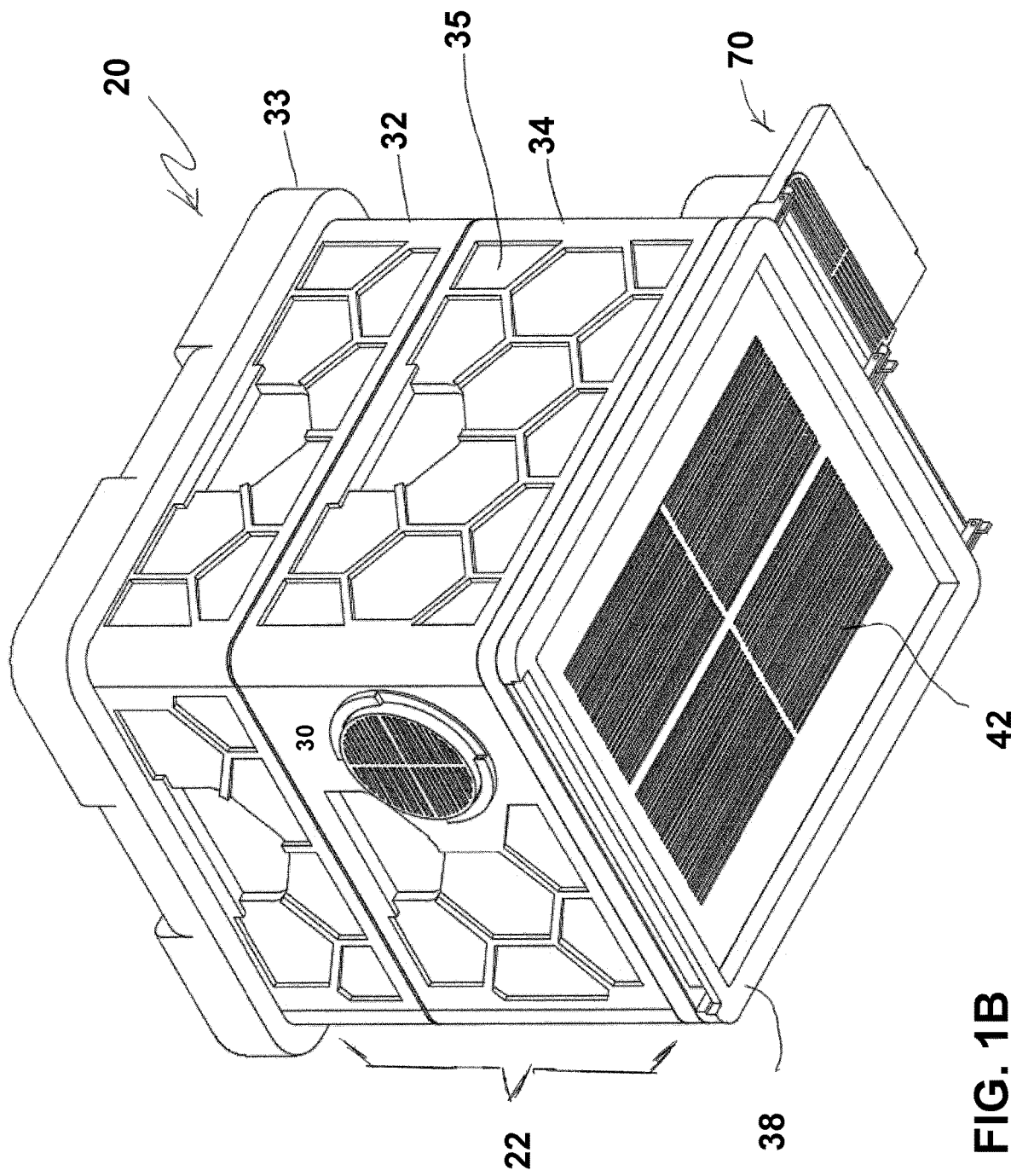
FIG. 1B is a second perspective view of the system of FIG. 1A, taken from a vantage point below and to the right of a back wall of the hive, with an inspection tray omitted from the drawing for purposes of illustration.

It should be understood that only structures and methodology needed for illustrating selected embodiments of the present invention are described herein. Other conventional structures, and those of ancillary and auxiliary components of the system, will be known and understood by those skilled in the art.

Referring now to FIGS. 1A-1B and 2A-2C, a complete beehive system is shown generally at 20, including an insulated main hive body 22 having first and second access ports 24, 26 formed in opposite frame-supporting side walls 28, 30 thereof. One or both of the access ports 24, 26 may be optionally provided with a removable, thermostatically controlled vent assembly 50. The vent assembly 50 will be described in further detail below.

The main hive body 22 includes an upper hive body 32 with a removable roof panel 33, and a lower hive body 34 including the previously mentioned frame-supporting side walls 28, 30 having the access ports 24, 26 formed respectively therein, along with two additional side walls 35, 36, and a bottom board 38.

As seen in the detail view of FIG. 2D, each of the frame-supporting side walls 28, 30 has a right-angle groove 28g formed in an upper, inside edge thereof facing toward the interior of the hive, in order to support flanges 45f provided on opposite sides of frames 45.

Figure 2A:
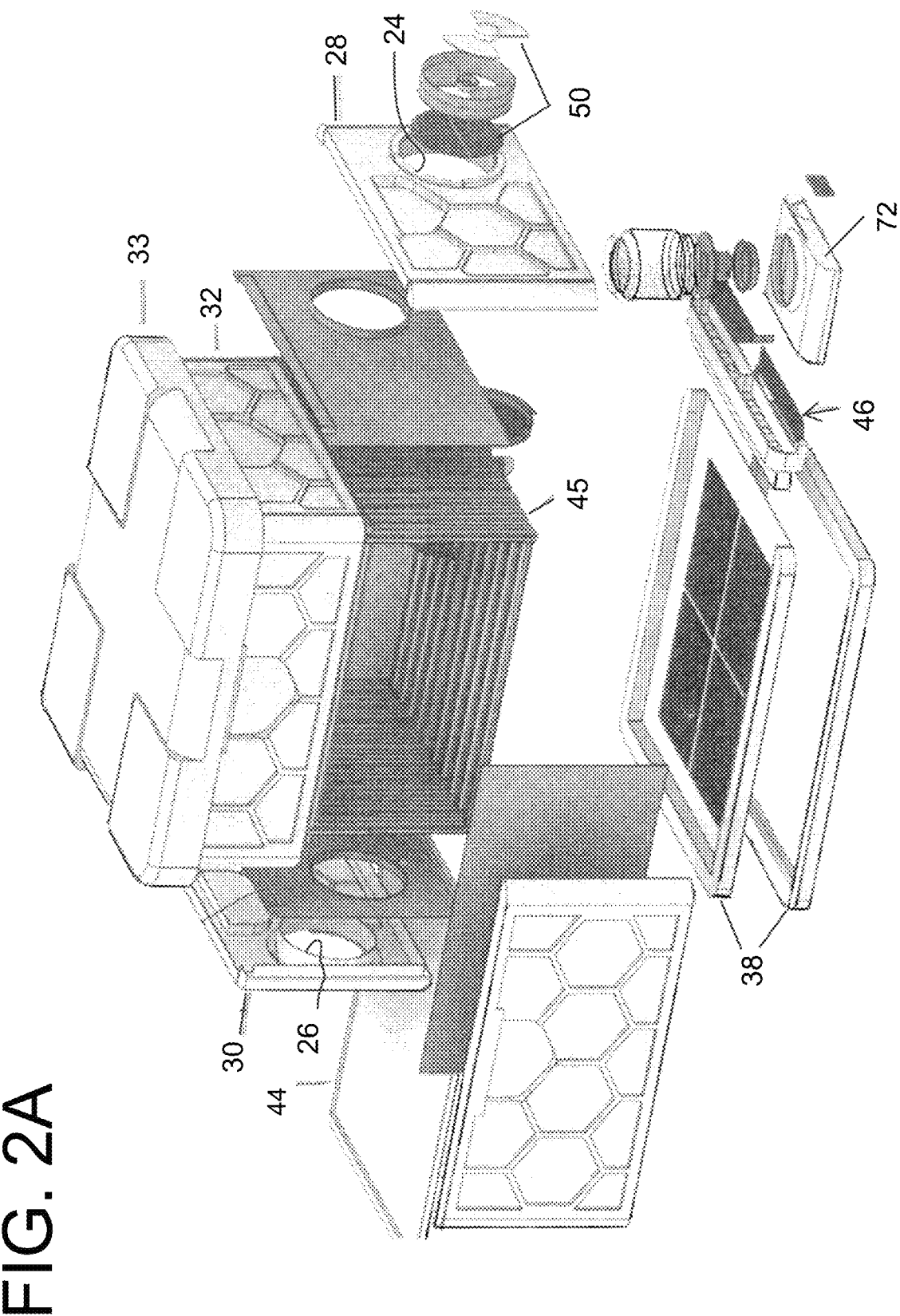
FIG. 2A is a first exploded perspective view of the hive system of FIGS. 1A-1B, similar to taken from a vantage point similar to FIG. 1 and showing the double paneled design and general assembly.
Figure 2B:
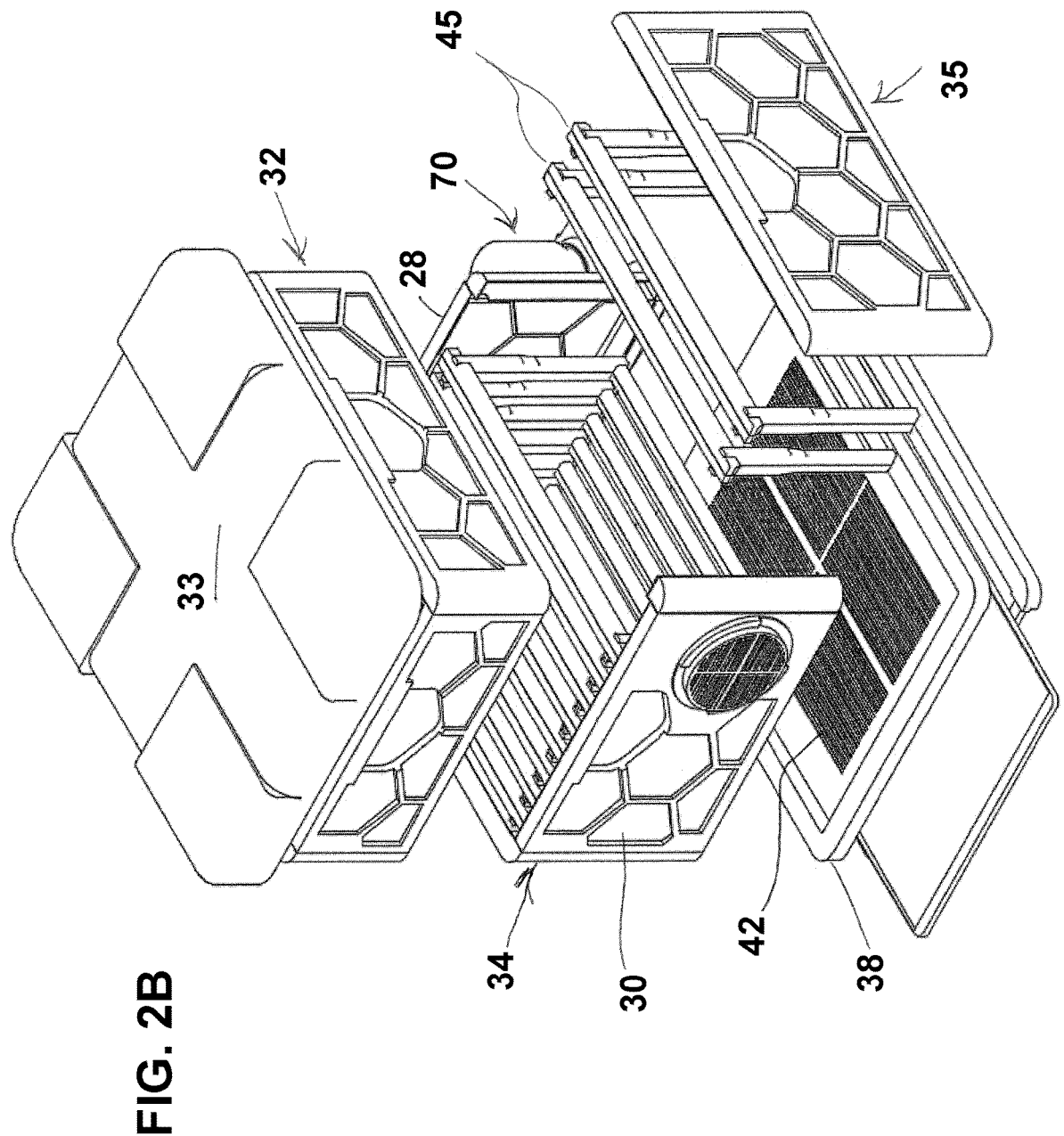
FIG. 2B is a second exploded perspective view of the hive system hereof, taken from a vantage point above and to the right of a rear wall of the hive.

FIGS. 2A-2B are exploded views of the system 20, showing individual components of the lower hive body 34. The bottom board 38 is provided with a molded-in screen 42, and the lower hive body 34 may, optionally, include an inspection tray 44 to selectively permit viewing of the bottom board 38. The location of the inspection tray 44 is shown best in FIG. 2B.

The beehive system 20 may also include a plurality of removable frames 45, which may have a generally conventional configuration. Alternatively, commercially available frames may be used. Each of the frames 45 is an open structure configured to supportively hold a honeycomb or brood comb (not shown) within the hive main body 22.

Figure 2C:
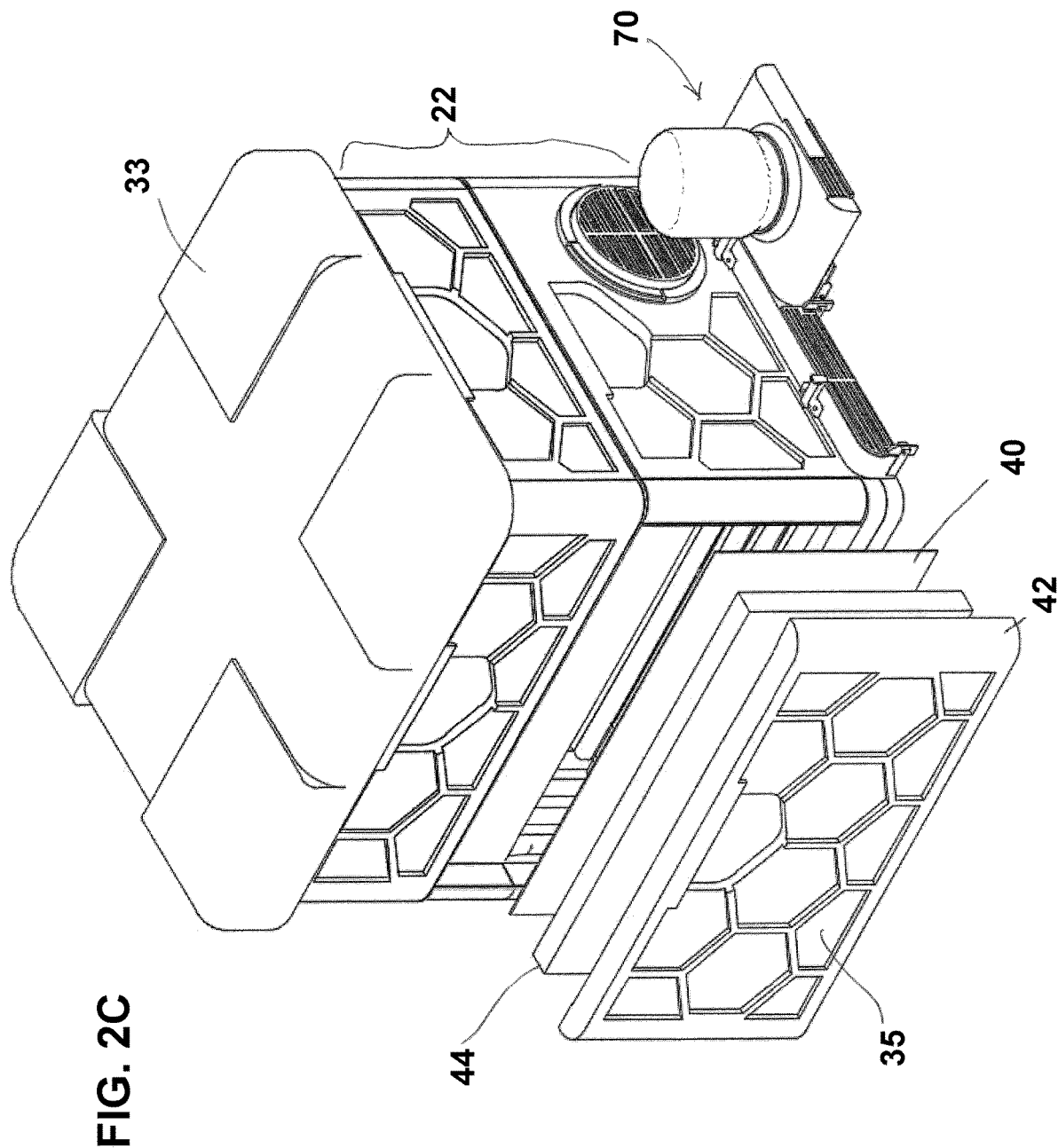
FIG. 2C is a modified perspective view of the hive similar to FIG. 1A, but with one wall of the lower section of the hive shown exploded to illustrate a construction thereof.

Each of the side walls 26, 28, 35, 36 of the main hive body 22 has a three-part laminated structure. FIG. 2C is a front detail view of the hive, including an exploded perspective view of a side wall 35 showing a foam board 44 disposed between inner and outer panels 40, 42. The roof panel 33 may have a similar insulated structure.

The core of the side wall 36 is provided by the foam board 44 to increase thermal properties of the hive, helping the bees stay warm in the winter, and reducing overall heat stress on honey bees in the hive during warm seasons, particularly in a situation where the hive is in transport on a truck, where temperature of the truck bed is not regulated. The inner and outer molded panels 40, 42 may each be formed of hemp plastic, or another suitable weather-tolerant plastic. The inner and outer molded panels 40, 42 lock together, creating a cavity therebetween for the foam board 44.

Optionally, the system may also include a closeable entrance structure 46 and a feeder assembly 70, where each of these optional components is removably attachable to the main hive body 22. The feeder assembly 70, where used, may provide extra food and/or water for the bees, as desired.

Entrance Structure

Figure 3A:
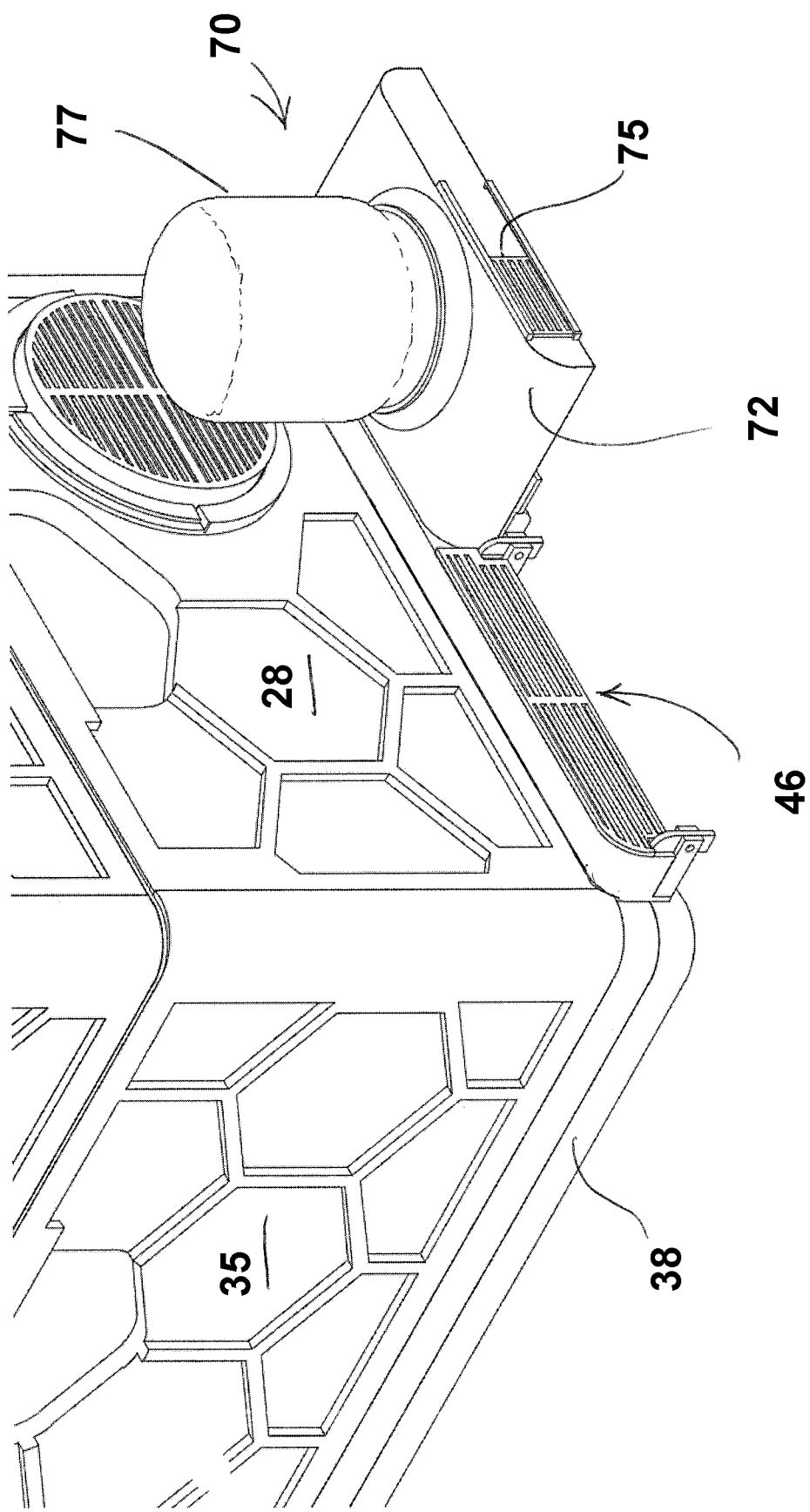
FIG. 3A is a detail perspective view showing an entrance to the hive and an optional feeder assembly.

FIGS. 3A and 3B illustrate detail perspective views of the entrance structure 46 and the feeder assembly 70. FIG. 3B is an exploded perspective view showing some of the internal structure.

The entrance structure 46 is designed to allow additional accessories to be added to the hive easily. In the depicted embodiment of the system 20, the entrance structure 46 includes a double gated entrance having two independently operable gates 48, 49, which selectively permit access to, or close off entrance to openings formed in the hive body 22 on either side or on both sides of the entrance structure. Each of the gates 48, 49 may be separately opened or closed to allow restriction to, or full closure of the hive. The vented gates 48, 49 can be closed to confine the bees for transport, or for whatever other reason is needed.

The entrance structure 46 includes a frame portion 46f which extends outwardly from the main hive body 22, in order to give guard bees a covered and confined area to guard against invaders. The frame portion 46f surrounds and defines a socket 46s configured to supportively receive a feeder assembly 70 or other accessories therein.

One or more entry ports 46ep are formed at a back wall of the entrance structure 46 in an area inside of, and surrounded by the frame portion 46f, and these entry ports communicate with an opening (not shown) formed through a lower edge portion of the front wall 28 of the main hive body 22, to allow bees to enter and exit the main hive body when the gates 48, 49 are open.

When hinged open, the gates 48, 49 act as drained landing platforms, where parallel vent slots or other openings formed therein are effective to drain any accumulated water therethrough. In the closed position, each of the gates 48, 49 is secured by a latch which may provide an interference fit between the gate and the frame portion 46f.

Vent Assembly

The system 20 hereof includes at least one vent assembly 50 installed in the first access port 24 formed in the front frame-supporting wall 28 of the main hive body 22. Optionally, the system may further include a second vent assembly 50 installed in the second access port 26 formed in the rear frame-supporting wall 30 of the main hive body 22, where the second vent assembly 50 is substantially identical to the first vent assembly as described herein.

Using dual vent assemblies provides an advantage, in that both vent assemblies 50, 50 are closed during cold weather, and both vent assemblies also open automatically during warm weather, to provide a route for cross-flow ventilation through the main hive body 22.

As shown in the exploded view of FIG. 4, the vent assembly 50 includes a cylindrical outer support collar 50c, which is affixed to a circular opening formed in the front wall 28 of the valve body. The outer support collar 50c may be provided with bosses 50b having arcuate grooves 50g formed therein.

The outer support collar 50c may be made as a separate piece, for inclusion in a retrofit kit made for use on conventional beehives, or optionally, if desired, the outer support collar 50c may be molded as an integral part of the front wall 28 of the main hive body.

The vent assembly 50 also includes a valve case 51 which fits coaxially inside of the outer support collar 50c. The valve case 51 includes a cylindrical outer housing 51h, a hollow cylindrical socket or core 52 disposed coaxially inside a central portion of the housing, and a plurality of opposed, wedge or sector-shaped panels such as those shown at 53, 54, where these panels interconnect the outer housing and the core.

The valve case 51 also has a plurality of open, wedge or sector-shaped openings such as those shown at 55a, 55b formed therein between the panels 53, 54.

The vent assembly 50 also includes a pivotally movable valve member 62 that cooperates with the valve case 51 to regulate air flow through the vent assembly, according to ambient temperature. The valve member 62 includes a central, cylindrical core portion 63 and a plurality of wedge or sector-shaped blades such as those shown at 64, 65 extending radially outwardly from the core portion.

The blades 64, 65 of the valve member 62 generally have a shape resembling an outline shape of a slice taken out of a round pizza, with the tip of the slice removed. This shape may be described as a truncated sector.

It will be noted that the valve member 62 has a shape resembling a propeller. However, the valve member does not rotate like a propeller. Instead, the valve member 62 generally moves through only 90 degrees of travel, from a fully closed to a fully open position. When the valve member 62 reaches the fully open position, the valve member contacts a stop member (not shown) provided inside of the valve case 51 to hold the valve member 62 at the fully open position, and prevent further movement thereof past the stop member. This 90 degree pivotal movement of the valve member 62 is made possible via the operation of a bimetallic coil 56 housed in the central core 52 of the valve case 51. The bimetallic coil 56 operates by expanding or contracting when the temperature changes, and does not require any external power to operate. Bimetallic coils are commercially available, and are used for some thermostats and other commercial applications, but to applicant's knowledge and understanding, bimetallic coils have never been used in beehive vent assemblies, of the type described herein, prior to the present invention.

The valve case 51 and the valve member 62, together with the bimetallic coil 56 interposed therebetween, cooperate to define a temperature-dependent valve which automatically regulates air flow through the vent assembly 50, without requiring a battery or other power source.

In the depicted embodiment of the vent assembly 50, the valve case 51 includes two sector-shaped panels 53, 54 and two sector-shaped openings 55a, 55b formed between the panels. In addition, the valve member 62 is shown with two blades 64, 65. However, in the practice of the present invention, any number of blades between two and ten may be used, and any number of openings between two and ten may be used, so long as the number and dimensions of the blades correspond to the number and dimensions of the openings in the valve case 51.

The vent assembly 50 also includes an external perforated screen cover 57 with locking flanges 58 extending radially outwardly thereon, the screen cover configured to allow air flow into or out of the main hive body 22. Only one locking flange 58 is visible in FIG. 4 due to the vantage point, but a similar flange is provided on the opposite side of the screen cover 57.

An internal screen cover 59 may, optionally, be additionally provided on the inside of the vent assembly 501 to further screen air coming into the hive and to prevent bee passage.

As previously noted, the depicted embodiment uses an outer screen cover 57 having radial flanges 58, 60 thereon to attach the vent assembly 50 to the arcuate grooves 50g provided on the outer support collar 50c.

However, as an alternate mounting method, the outer screen cover 57 may be made without the radial flanges 58, and the exterior of the valve case 52 may be modified to have male screw threads (not shown) thereon to permit the vent assembly 50 to be threadably mounted to the outer collar 50c or directly to front wall 28 of the hive body. Other attachment structure known to those in the art may alternatively used to removably attach the vent assembly 50 to the main hive body 22, or to attach the outer screen cover 57 to the outer collar 50c.

As previously noted, in one embodiment hereof, each of the access ports 24, 26 formed in the side walls 26, 28 of the main hive body 22 may have a separate vent assembly 50 installed therein, each vent assembly equipped with a bimetallic coil 56, so that when the hive becomes warm, both vent assemblies open automatically to provide cross-flow ventilation through the main hive body 22, and conversely, when the hive cools down, both vent assemblies close up.

Feeder Assembly

The optional feeder assembly 70 includes a hollow feeder body 72, made in a substantially flattened shape, and configured to firmly fit inside of the socket 46s of the gate's frame portion 46f on one side of the entrance structure 46. The feeder body 72 has a passage 74 formed therethrough, to allow bees to pass through the feeder assembly and enter the main hive body 22.

The upper surface of the feeder body 72 has a hollow cylindrical sleeve 73 formed centrally therein, the sleeve having female threads formed therein to threadably receive a mouth portion of a jar or other food container 77.

The feeder assembly 72 includes a two-part dispenser 76, and this dispenser uses vacuum that builds up within the food container 77, to slowly and evenly dispense liquid into a bee feeding tray 78. Optionally, the feeder body 72 may also have a small, closeable gate 75 thereon at the entrance to the passage 74, to allow control over the flow of bees therethrough.

Other, optional accessories could be provided to attach to the access ports 24, 26 of the respective frame-supporting side walls 28, 30, as desired by a beekeeper. As one example, a fondant feeder (not shown) could be made to fit into one or both of the access ports 24, 26 to provide easily accessible food to bees in the hive during winter months, when ventilation is not needed and other food is scarce.

The present invention also contemplates a kit for use in retrofitting existing beehives to add vent assemblies 50 to such existing beehives. Where used, the kit would include either one or two vent assemblies 50 as described herein. Optionally, the kit according to the invention could also include the closeable entrance structure 46, and if so desired the kit could also include the feeder assembly 70.

Figure 5A:
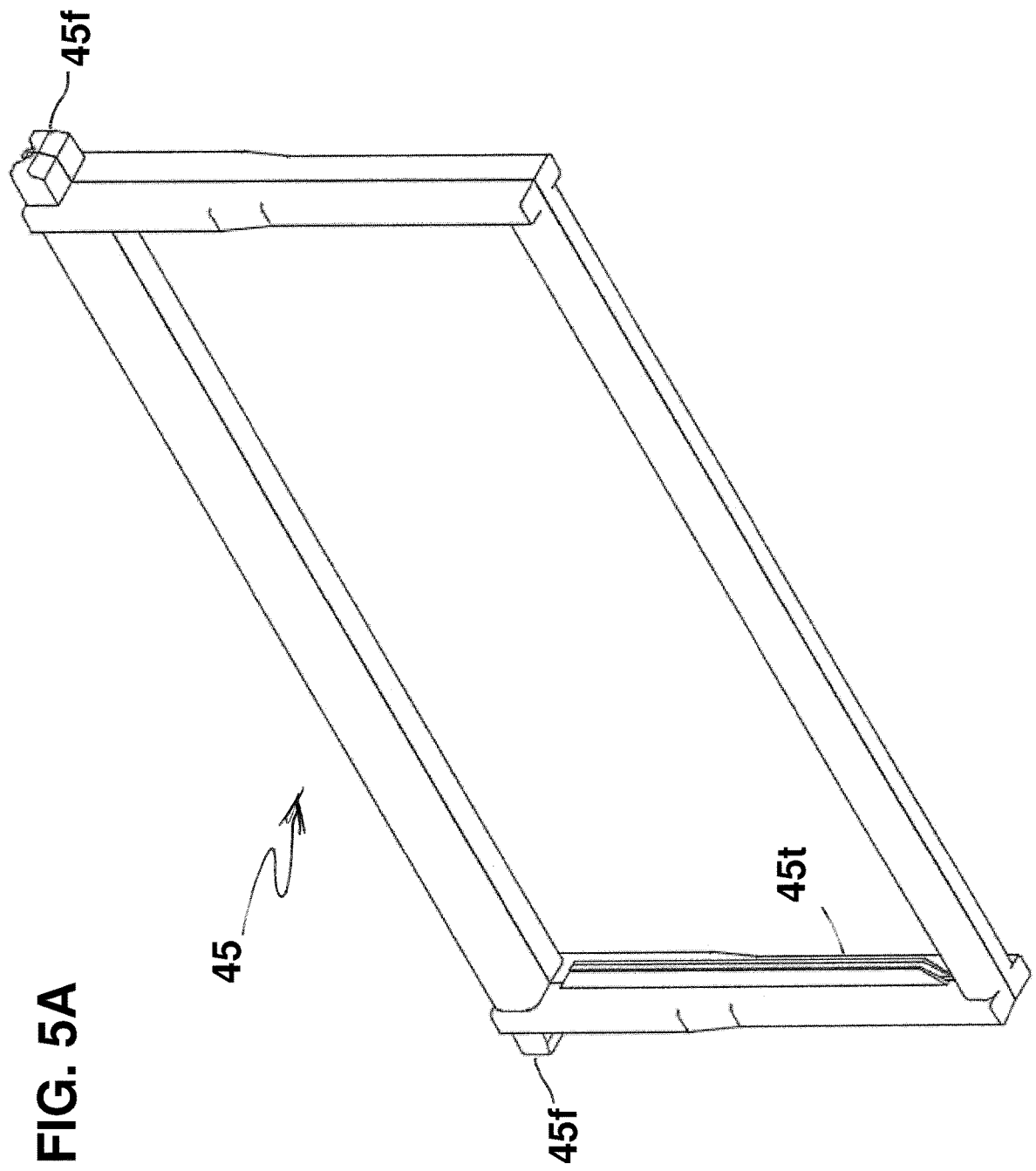
FIG. 5A is a first perspective view of a frame assembly which is a component of the system of FIGS. 1A-1B, showing the frame in a closed position.
Figure 5B:
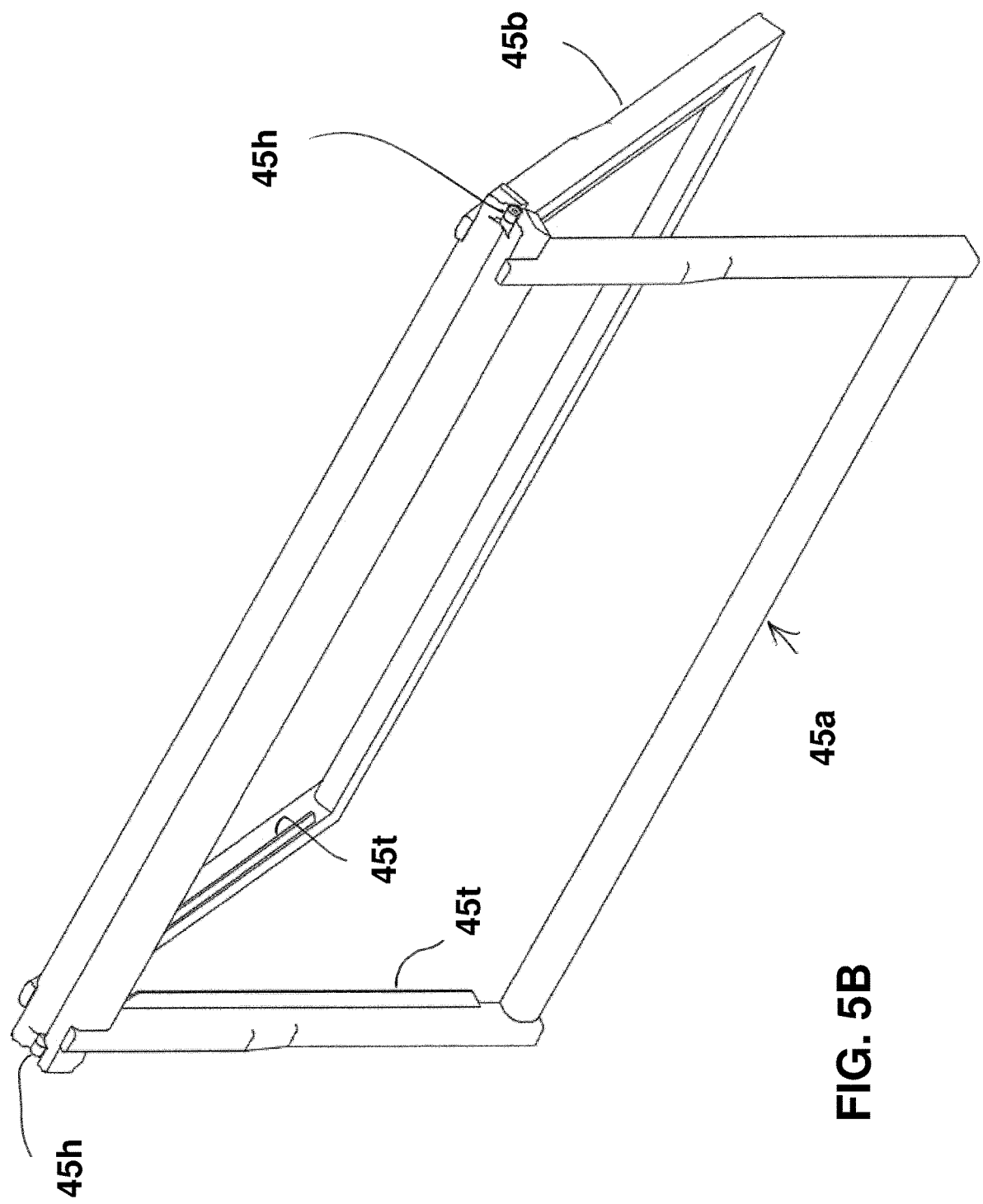
FIG. 5B is a second perspective view of the frame assembly of FIG. 5A, showing the frame in an open position.

Referring now to FIGS. 5A-5B, a novel frame according to the invention is shown generally at 45. This frame 45 includes two frame sections 45a, 45b interconnected by a pivot hinge 45h. Each of the frame sections 45a, 45b may include a flexible, inwardly-extending tab 45t on each vertical side section thereof, as shown, and these tabs cooperate to hold a wax or plastic foundation (not shown) therebetween inside of the frame, and the bees can then use the foundation to create honeycomb or brood comb structures inside of the hive. These tabs may be made of a flexible plastic, such as polypropylene or other flexible plastic, or may be made from a suitable elastomer.

The present invention does not include such foundations, but they are known and commercially available.

A method of retrofitting an existing bee hive to provide ventilation thereto is also contemplated by the present invention.

Figure 6:
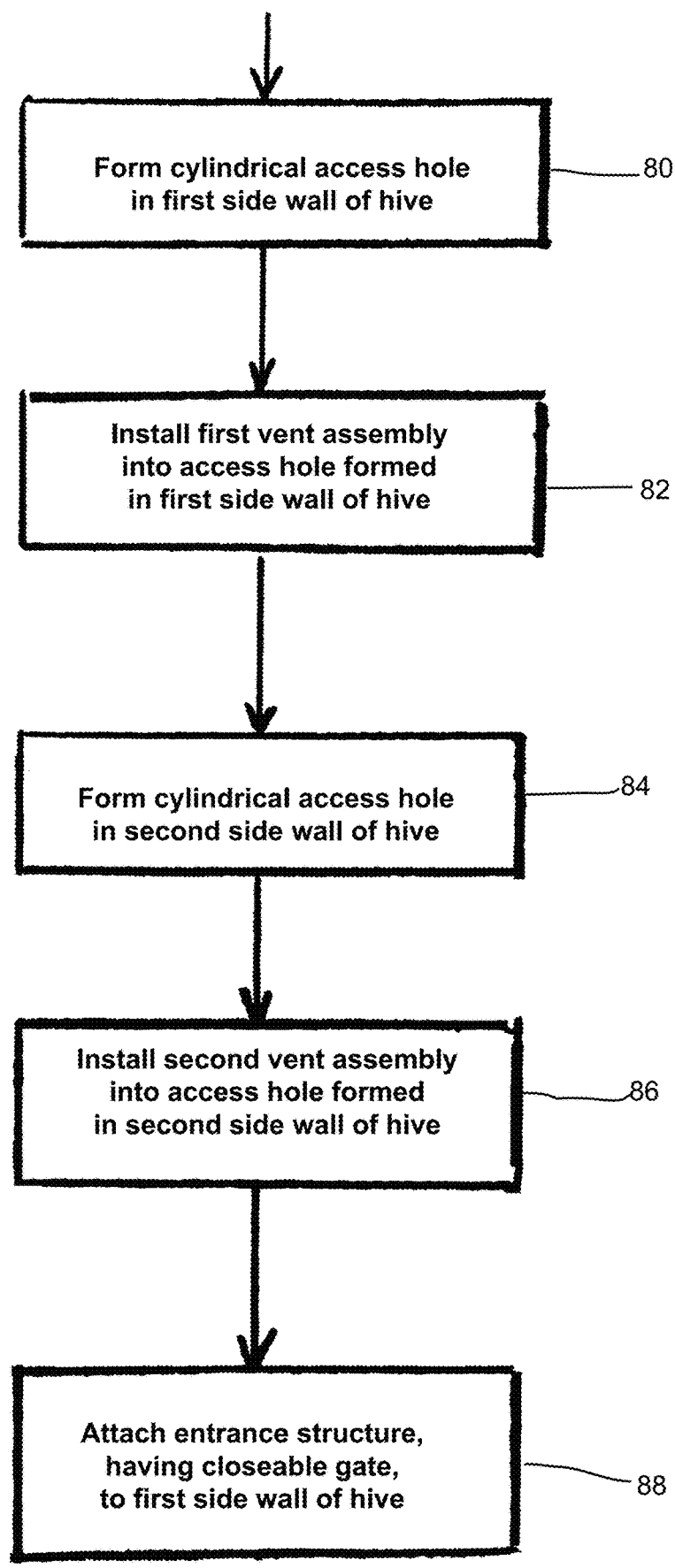
FIG. 6 is a flow chart showing steps in a method of retrofitting an existing beehive to add features of the system according to the invention to the hive.

Referring now to FIG. 6, the method includes a first step of forming a cylindrical access hole in a first side wall of the bee hive. This step is shown at 80 in the flow chart of FIG. 6.

The method hereof also includes a second step of installing a first vent assembly in the access hole formed in the first side wall. This step is shown at 82 in FIG. 6. The first vent assembly may be removably attached to permit later attachment of other, different accessories to the access hole formed in the first side wall.

The first vent assembly may be the vent assembly 50 as previously described herein. The vent assembly 50 may or may not include a cylindrical outer collar 50c, depending on whether or not the outer screen cover 57 is removable. However, the first vent assembly should include a valve case 51, a pivotally movable valve member 62 that cooperates with the valve case to selectively restrict or allow air flow through the vent assembly, and a bimetallic coil member interposed between and interconnecting the valve case and the valve member. Preferably, the vent assembly 50 should also include a foraminous screen cover 57 operatively attached to the valve case 51, the screen cover configured to allow air to flow therethrough.

The method according to the present invention may, optionally, also include a step of forming a cylindrical access hole in a second side wall of the beehive, the second side wall located opposite the first side wall. This step is shown at 84 in the flowchart of FIG. 6.

The method hereof also may include another step of installing a second vent assembly in the access hole formed in the second side wall. This step is shown at 86 in FIG. 6.

The second vent assembly may also be a vent assembly 50 as described herein.

The method hereof also may, optionally, include an additional step of attaching an entrance structure having a closeable gate to the first side wall. The entrance structure may be the entrance structure 46 as previously described herein. This step is shown at 88 in FIG. 6.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

I claim:

1. A beehive system comprising:
    a main hive body having a floor, four side walls and a removable roof panel, each of the side walls having insulating material therein, wherein the side walls and floor cooperate to define an interior of the hive body, and two of the side walls disposed opposite one another each have an access port formed respectively therethrough,
    at least one vent assembly configured to fit into one of the access ports, the vent assembly comprising:
    a valve case having a cylindrical outer housing, a core portion disposed coaxially inside of the housing, and a plurality of sector-shaped panels interconnecting the outer housing and the core portion, wherein a plurality of sector-shaped openings are formed in the valve case between the panels;
    a pivotally movable valve member that cooperates with the valve case to regulate air flow through the vent assembly, the valve member having a central core portion and a plurality of sector-shaped blades attached to and extending radially outwardly from the core portion;
    a bimetallic coil member interposed between and interconnecting the valve case and the valve member; and
    a perforated screen cover operatively attached to the valve case on a side of the valve case closer to the interior of the hive body than the valve member, the screen cover configured to allow air flow therethrough.

2. The beehive system of claim 1, wherein each of the side walls of the main hive body comprises a plastic outer wall, a plastic inner wall and the insulating material including an insulating foam board disposed between the inner and outer walls.

3. The beehive system of claim 1, further comprising an entrance structure attached to the main hive body, the entrance structure comprising at least one closeable gate.

4. The beehive system of claim 3, further comprising a feeder assembly that fits in the closeable gate, the feeder assembly comprising:
    a hollow feeder body configured to firmly fit in the entrance structure with the gate open, the feeder body having a passage formed therethrough to allow bees to pass through the feeder assembly and enter the hive, wherein the feeder body has a closeable outer gate at the entrance to the passage to control a flow of bees therethrough;
    a container for holding a liquid bee food; and
    a dispenser that uses vacuum that builds up within the container to regulate dispensing of the bee food into a bee feeding tray.

5. The beehive system of claim 1, wherein the valve assembly is attachable to the main hive body via a bayonet mount, in which a plurality of radially extending flanges are provided on the outer screen cover, the flanges slidably insertable into a plurality of arcuate grooves provided in an outer collar attached to the main hive body.

6. A kit of components usable to modify a beehive to selectively provide ventilation thereto, the kit comprising:
    at least one vent assembly configured to fit into an access port in a wall of a beehive, the vent assembly comprising:
    a valve case having a cylindrical outer housing, a core portion disposed coaxially inside of the housing, and a pair of opposed sector-shaped panels interconnecting the outer housing and the core portion, wherein a pair of open sector-shaped openings are formed inside of the valve case between the panels;
    a pivotally movable valve member that cooperates with the valve case to selectively restrict or allow air flow through the vent assembly, the valve member having a central core portion and two opposed sector-shaped blades attached to and extending radially outwardly from opposite sides of the core portion;
    a bimetallic coil member interposed between and interconnecting the valve case and the valve member; and
    a foraminous screen cover operatively attached to the valve case, the screen cover configured to allow air to flow therethrough,
    wherein the vent assembly is configured to be installed with the screen cover on a side of the valve case closer to an interior of the beehive than the valve member.

7. The kit of claim 6, wherein the vent assembly further comprises an outer cylindrical collar including a plurality of bosses having arcuate grooves formed therein.

8. The kit of claim 6, further comprising a second vent assembly.

9. The kit of claim 6, further comprising an entrance structure comprising at least one closeable gate.

10. The kit of claim 9, further comprising a feeder assembly that fits into the gate, the feeder assembly comprising:
- a hollow feeder body configured to firmly fit in one side of the entrance structure, the feeder body having a passage formed therethrough to allow bees to pass through the feeder assembly and enter the hive, wherein the feeder body has a closeable gate at the entrance to the passage to allow control over a flow of bees therethrough;
- a container for holding a liquid bee food;
- a dispenser that uses vacuum that builds up within the container to slowly and evenly dispense liquid into a bee feeding tray.

11. A method of retrofitting an existing bee hive to provide ventilation thereto, said method comprising the steps of:
- forming a cylindrical access hole in a first side wall of the bee hive;
- installing a first vent assembly in the access hole formed in the first side wall, the vent assembly comprising:
  - a valve case having a cylindrical outer housing, a core portion disposed coaxially inside of the housing, and a pair of opposed sector-shaped panels interconnecting the outer housing and the core portion, wherein a pair of open sector-shaped openings are formed inside of the valve case between the panels;
  - a pivotally movable valve member that cooperates with the valve case to selectively restrict or allow air flow through the vent assembly, the valve member having a central core portion and two opposed sector-shaped blades attached to and extending radially outwardly from opposite sides of the core portion;
  - a bimetallic coil member interposed between and interconnecting the valve case and the valve member; and
  - a foraminous screen cover operatively attached to the valve case, the screen cover configured to allow air to flow therethrough, wherein the vent assembly is installed with the screen cover on a side of the valve case closer to an interior of the bee hive than the valve member.

12. The method of claim 11, further comprising steps of forming a second cylindrical access hole in a second side wall of the bee hive opposite the first side wall;
installing a second vent assembly in the access hole formed in the second side wall, the second vent assembly being substantially identical to the first vent assembly.

13. The method of claim 11, further comprising a step of attaching an entrance structure having a closeable gate to the first side wall.

14. A method of retrofitting an existing bee hive to provide ventilation and a closeable entrance structure thereto, said method comprising the steps of:
- forming a first cylindrical access hole in a first side wall of the bee hive;
- installing a first vent assembly in the first access hole formed in the first side wall,
- forming a second cylindrical access hole in a second side wall of the bee hive opposite the first side wall;
- installing a second vent assembly in the second access hole formed in the second side wall, the second vent assembly being substantially identical to the first vent assembly; and
- attaching an entrance structure having a closeable gate to the first side wall,
- wherein each of the first and second the vent assemblies comprises:
  - a valve case having a cylindrical outer housing, a core portion disposed coaxially inside of the housing, and a pair of opposed sector-shaped panels interconnecting the outer housing and the core portion, wherein a pair of open sector-shaped openings are formed inside of the valve case between the panels;
  - a pivotally movable valve member that cooperates with the valve case to selectively restrict or allow air flow through the vent assembly, the valve member having a central core portion and two opposed sector-shaped blades attached to and extending radially outwardly from opposite sides of the core portion;
  - a bimetallic coil member interposed between and interconnecting the valve case and the valve member; and
  - a foraminous screen cover operatively attached to the valve case, the screen cover configured to allow air to flow therethrough, wherein each of the first and second vent assemblies is installed with the screen cover thereof situated proximate an interior of the bee hive.

15. The method of claim 14, further comprising a step of attaching an entrance structure having a closeable gate to the first side wall.

16. A beehive system comprising:
- a main hive body having a floor, four side walls and a removable roof panel, each of the side walls having insulating material therein, wherein two of the side walls disposed opposite one another each have an access port formed respectively therethrough,
- first and second vent assemblies configured to removably fit into the access ports, each of the vent assemblies comprising:
  - a valve case having a cylindrical outer housing, a core portion disposed coaxially inside of the housing, and a plurality of sector-shaped panels interconnecting the outer housing and the core portion, wherein a plurality of sector-shaped openings are formed in the valve case between the panels;
  - a pivotally movable valve member that cooperates with the valve case to regulate air flow through the vent assembly, the valve member having a central core portion and a plurality of sector-shaped blades attached to and extending radially outwardly from the core portion; and
  - a bimetallic coil member interposed between and interconnecting the valve case and the valve member,
- wherein each of the vent assemblies is configured to dispense only ambient air.

* * * * *